(12) United States Patent
Makovsky et al.

(10) Patent No.: US 9,292,362 B2
(45) Date of Patent: Mar. 22, 2016

(54) METHOD AND APPARATUS TO PROTECT A PROCESSOR AGAINST EXCESSIVE POWER USAGE

(71) Applicant: Intel Corporation, Santa Clara, CA (US)

(72) Inventors: Lev Makovsky, Hafia (IL); Zeev Sperber, Zichron Yackov (IL); Efraim Rotem, Haifia (IL); Nir Rosenzweig, Givat Ella (IL); Stanislav Shwartsman, Hafia (IL); Raanan Sade, Kibutz Sarid (IL); Igor Yanover, Yokneam Illit (IL); Gavri Berger, Hafia (IL); Tomer Weiner, Mahane Miryam (IL); Ron Gabor, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 13/926,089

(22) Filed: Jun. 25, 2013

(65) Prior Publication Data

US 2014/0380338 A1 Dec. 25, 2014

(51) Int. Cl.
*G06F 1/04* (2006.01)
*G06F 9/54* (2006.01)
*G06F 9/30* (2006.01)
*G06F 9/48* (2006.01)
*G06F 1/32* (2006.01)

(52) U.S. Cl.
CPC .............. *G06F 9/542* (2013.01); *G06F 1/3206* (2013.01); *G06F 9/30* (2013.01); *G06F 9/4856* (2013.01)

(58) Field of Classification Search
CPC ........................................................ G06F 1/04
See application file for complete search history.

(56) References Cited

U.S. PATENT DOCUMENTS

2012/0166854 A1 6/2012 Rotem

*Primary Examiner* — Cheng-Yuan Tseng
(74) *Attorney, Agent, or Firm* — Trop, Pruner & Hu, P.C.

(57) ABSTRACT

In an embodiment, a processor includes at least a first core. The first core includes execution logic to execute operations, and a first event counter to determine a first event count associated with events of a first type that have occurred since a start of a first defined interval. The first core also includes a second event counter to determine a second event count associated with events of a second type that have occurred since the start of the first defined interval, and stall logic to stall execution of operations including at least first operations associated with events of the first type, until the first defined interval is expired responsive to the first event count exceeding a first combination threshold concurrently with the second event count exceeding a second combination threshold. Other embodiments are described and claimed.

20 Claims, 7 Drawing Sheets

METHOD AND APPARATUS TO PROTECT A PROCESSOR AGAINST EXCESSIVE POWER USAGE

TECHNICAL FIELD

Embodiments relate to protection of a processor against excessive power usage.

BACKGROUND

A voltage regulator (VR) may be limited in a maximum current it can supply to a circuit, and in a number of fast current spikes it can handle. To withstand these limitations, expensive voltage regulators may be used and/or voltage/frequency guard-bands may be added, each of which may result in a less attractive product.

A worst case condition may be modeled by a maximal theoretical power consumption scenario (e.g., Power Virus (PV)), which utilizes all micro-architectural (μArch) bandwidths and consumes power far in excess of the power utilized in execution of other applications. The worst case condition can cause extreme slowdown of operations execution, and can be potentially destructive to hardware.

DETAILED DESCRIPTION

Embodiments to enable reaction to a PV scenario can help to reduce VR cost and to reduce voltage/frequency guard-band size, and can improve performance of the VR.

Power Virus Protector (PVP) logic may limit a worst case power scenario, and may limit power consumption so that the power consumption in such a scenario is closer to that of everyday applications. Adjustments to execution μops to limit power usage by a core may be based on counts of specific μops executed and may occur independently of other power management issues handled by, e.g., operating system power management techniques such as apportionment of power among various cores of a processor.

In some embodiments, the PVP may use one or more counters or other techniques (e.g., sliding window) to track (e.g., monitor) activity of specific micro-architecture (μArch) events, such as operations ("μops"), executed during predefined constant intervals. The specific μops to be monitored may be associated with current transients that can affect processor reliability. If an activity level exceeds a predefined threshold during a given interval, the activity level of all events (or selected events) may be stalled, e.g., execution of μops stalled, until the end of the interval. Through a stall responsive to a comparison of one or more activity level monitors with corresponding thresholds, an average activity level may be controlled while full band-width utilization may be allowed in activity bursts/power usage bursts that may occur during execution of application(s).

To increase an impact on PV reduction, types of events may be selected to be tracked based upon, e.g., degree of activity and/or energy cost. Thresholds may be determined according to values stored in a control register (CR), (e.g., values that may be determined during processor fabrication) and power consumption can be adjusted, based on the thresholds, to improve performance. Alternatively, thresholds may be configurable by a power control unit (PCU), which may permit less aggressive thresholds (e.g., higher thresholds) when utilization of processor resources is low.

Figure 1:
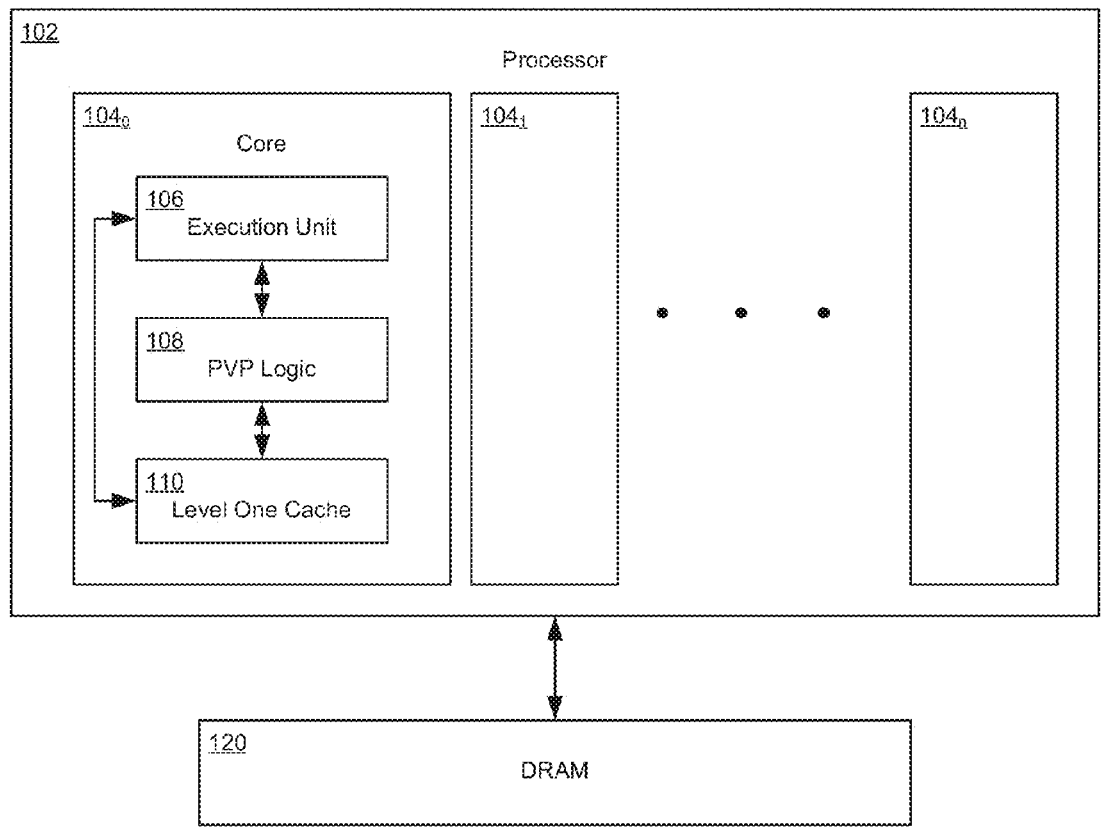
FIG. 1 is a block diagram of a system, according to embodiments of the present invention.

FIG. 1 is a block diagram of a system, according to embodiments of the invention. The system 100 includes a processor 102 including one or more cores $104_0$, $104_1$, $104_n$, and a dynamic random access memory (DRAM) coupled to the processor 102. The core $104_0$ includes an execution unit 106 to execute μops, power virus protector (PVP) logic 108, and a level one cache 110. The PVP logic 108 may include hardware, software, firmware, or a combination thereof. The core $104_0$ may include other logic, e.g., out of order logic (OOO), not shown here for simplicity of presentation.

In operation, the PVP logic 108 may track execution of one or more selected types of events, e.g., maintain a count of operations of a first type that have been executed during a defined interval, e.g., an interval that spans X cycles of the processor, where X is a defined number. For example, the operations of the first type may be "heavy μops," e.g., vector floating point operations, loads, stores, or other μops. In an embodiment, heavy μops may be tracked by a dedicated counter located in the OOO. Execution of heavy μops may be associated with large power consumption of the processor 102. Alternatively, the PVP logic 108 may track another type of event such as execution of vector source read or write operations, or level one cache loads or stores, or another type of event. For example, if level one cache loads or stores are being tracked, another dedicated counter (not shown) may be included in the level one cache 110. In an embodiment, the counter may count data banks (e.g., each data bank may include 4 bytes, with 16 banks per cache line) that are written to or read from the level one cache 110 to complete execution of operations during the defined interval. In an embodiment, a "sliding window" technique may be employed to count accesses (e.g., loads and/or stores) to the level one cache 110, e.g., through use of a first-in-first-out (FIFO) buffer. For example, a change in FIFO stored contents may be determined for a sliding temporal window and may be compared with a first threshold. An outcome of the comparison may be used, alone or in combination with another comparison of events of another type to another threshold, to determine whether to stall dispatches and/or executions of additional operations.

The PVP logic 108 may compare a first event count, e.g., count of executed heavy μops, to a threshold. The threshold may have been set by a control device such as a control register (not shown), a power control unit (not shown), or by another control device. For example, the threshold may be set based on a predicted activity level associated with execution of one or more operations, e.g., the threshold may be set to a high value if the predicted activity level of execution of operations is low.

In an example, if the first count of type one events exceeds the threshold during the defined interval, the PVP logic 108 may cause a stall of execution (and/or dispatch) of additional operations until the defined interval expires. Upon expiration of the defined interval, the first count may be cleared and the stall may be removed to permit execution of subsequent operations by the execution unit 106. A cycle counter within the PVP logic 108 may count cycles until the defined interval expires may be reset and the cycle count may continue. In some embodiments the stall may be a stall of all additional operations. In other embodiments the stall may be selectively applied to, e.g., heavy μops.

In some embodiments, a second event count associated with execution of operations may be tracked during the defined interval, and the second event count may be compared with a second threshold that may be determined by, e.g., control logic. For example, the second event count may be a count of vector source reads for each vectorized μop executed in the defined interval, e.g., a vectorized μop that reads operands from three vector registers may increase the second type count by 3. During the defined interval if either the first event count exceeds the first threshold or the second event count exceeds the second threshold, the execution unit 106 may be stalled until the defined interval is expired. In another embodiment, if the first event count exceeds the first threshold while the second event count does not exceed the second threshold, execution of operations associated with events of the first type may be selectively stalled. For example, if events of the first type are vectorized floating point operations, then if the first event count exceeds the first threshold, additional vectorized floating point operations may be stalled (e.g., selectively stalled) while other operations are executed during the defined interval.

In another embodiment, the first event count may be compared to a first combination threshold that is smaller than the first threshold, and the second event count may be compared with a second combination threshold that is smaller than the second threshold, and if the first event count exceeds the first combination threshold concurrently with the second event count exceeding the second combination threshold, the execution unit 106 may be stalled until the defined interval is expired. In an embodiment, if the first event count exceeds the first threshold and the second event count does not exceed the second combination threshold, operations associated with events of the first type may be selectively stalled, while other operations may be permitted to execute during the defined interval.

Upon expiration of the defined interval, the first event count and the second event count may be cleared and the stall may be removed to permit execution of subsequent operations by the execution unit 106. The cycle counter may be reset and the cycle count continues for a next defined interval. In an embodiment, each successive defined interval has a same number of cycles per interval as the first defined interval.

In some embodiments, additional counters may count other events during the defined interval, e.g., events associated with high power usage. (For example, a count of accesses to level one cache may be determined through use of a FIFO and a sliding window technique.) Each event count may be compared with a corresponding threshold that may be determined by, e.g., the control logic and may be stored in, e.g., a respective control register. When a particular event count exceeds the corresponding threshold, execution of additional operations may be stalled until expiration of the defined interval. In another embodiment, a stall of execution of additional operations may be triggered by a combination of two or more counters that exceed respective thresholds. For example, a first event counter of a first type of event may have a first combination threshold that, when exceeded, does not trigger the stall unless a second counter of a second type of event exceeds a second combination threshold. When the first counter exceeds the first combination threshold and the second counter exceeds the second combination threshold, execution of additional operations may be stalled until expiration of the defined interval. In another embodiment, each of a plurality of counters may have a single type event threshold ("event threshold") and a combination event threshold ("combination threshold"), less than the single type event threshold, so that when two of the counters exceed their respective combination thresholds, execution of additional operations is stalled, or when one of the counters exceeds its respective single type event threshold, execution of additional operations is stalled. In another example, when one of the counters exceeds its respective single type event threshold, execution of selected operations (e.g., of the same type as is counted by the counter) may be stalled while other operations are permitted to be executed.

Figure 2:
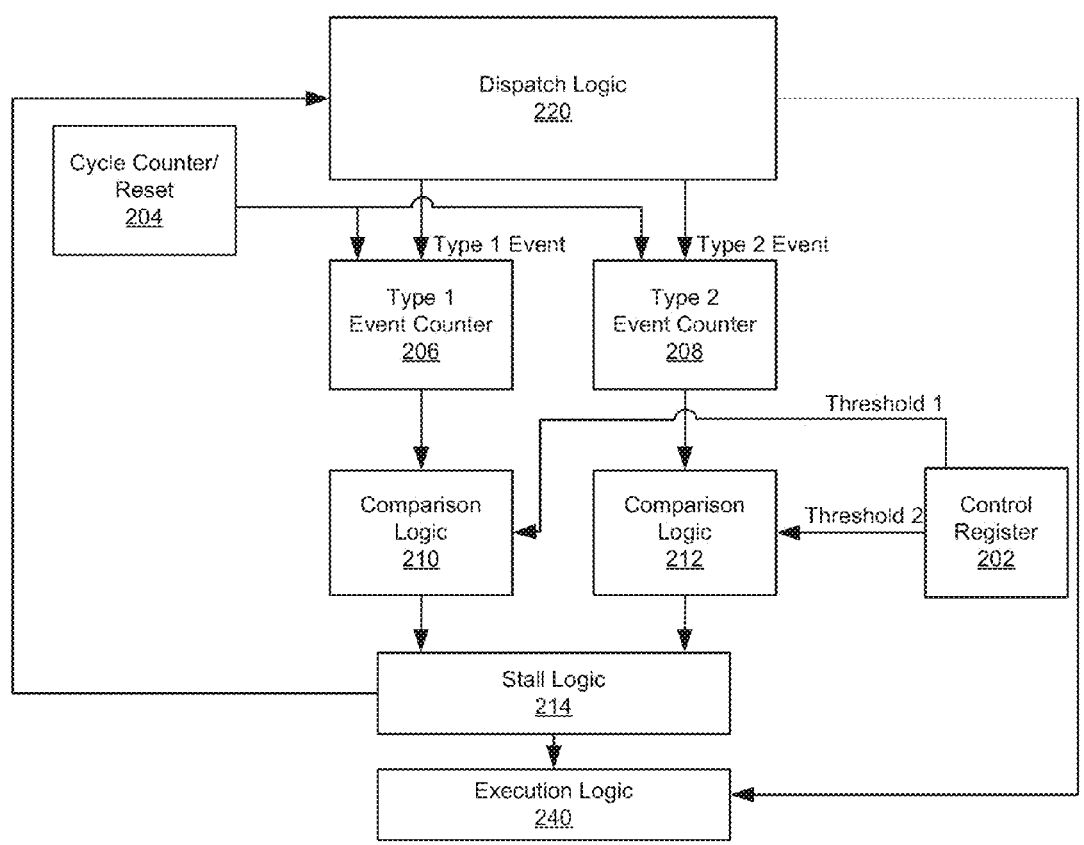
FIG. 2 is a block diagram of an apparatus to protect a processor against excessive power usage, according to embodiments of the present invention.

FIG. 2 is a block diagram of an apparatus to protect a processor against excessive power usage, according to embodiments of the present invention. The apparatus 200 includes a control register 202, a cycle counter 204, a type 1 event counter 206, a type 2 event counter 208, comparison logic 210, comparison logic 212, stall logic 214, dispatch logic 220, and execution logic 240. In some embodiments, additional counters and corresponding comparison logic may be included, e.g., in parallel with the type 1 event counter 206 and comparison logic 210. The apparatus may be included in the processor, and may be implemented in software, hardware, firmware, or a combination thereof.

In operation, the dispatch logic 220 may dispatch operations to the execution logic 240. The control register 202 may store a first threshold associated with type 1 events and a second threshold associated with type 2 events. For example, the type 1 events may be execution of vectorized floating point operations, or another type of operation, e.g., an operation type that is associated with a high power usage. The type 2 event counter may count, e.g., vector source reads for vectorized μops, or level one cache reads/writes associated with execution of operations, or another type of event, such as an event associated with high power consumption by the core that executes the operations.

The type 1 event counter 206 may track execution of type 1 operations during a defined interval, e.g., maintain a count of dispatched type 1 operations indicated as dispatched by the dispatch logic 220. The defined interval may be set based on, e.g., data stored in the control register 202. The type 2 event counter 208 may track dispatch of type 2 events during the defined interval and indicated by the dispatch logic 220.

The comparison logic 210 may compare a first count of type 1 events dispatched during the defined interval, to a first threshold received from the control register 202 (or alternatively from a power control unit, not shown). If the first count exceeds the first threshold during the first defined interval, the comparison logic 210 may provide an indication to the stall logic 214 to cause a stall in dispatch of additional operations and/or to cause a stall in execution of additional operations, until expiration of the first defined interval. In another embodiment, responsive to the first count exceeding the first threshold during the first defined interval, dispatch and/or execution of additional operations associated with events of the first type may be selectively stalled while other operations are permitted to execute during the first defined interval.

The comparison logic 212 may compare a second count of type 2 events dispatched during the first defined interval, to the second threshold. If the second count exceeds the second threshold during the first defined interval, the comparison logic 212 may provide an indication to the stall logic 214 to stall dispatch and/or execution of additional events until expiration of the first defined interval. In another embodiment, responsive to the second count exceeding the second threshold during the first defined interval, dispatch and/or execution of additional operations associated with events of the second type may be selectively stalled while other operations are permitted to execute during the first defined interval.

In another embodiment, the control register may store a first combination threshold that may be, e.g., smaller than the first threshold, and a second combination threshold that may be, e.g., smaller than the second threshold. The comparison logic 210 may perform a comparison of the first count with the first combination threshold and the comparison logic 212 may perform a comparison of the second count with the second combination threshold, and if the first count exceeds the first combination threshold concurrently with the second count exceeding the second combination threshold, the stall logic 214 may receive an indication to stall the dispatch and/or the execution of additional operations until the expiration of the first defined interval, and may communicate the stall to the execution logic 240 and/or to the dispatch logic 220.

Upon expiration of the first interval, the cycle counter 204 may be reset, the type 1 event counter 206 may be cleared, and the type 2 event counter 208 may be cleared. The cycle counter 204 can resume the cycle count for a second defined interval. In an embodiment, each defined interval has a same number of cycles.

Monitoring dispatch of one or more specific types of operation over a defined interval and stalling dispatch and/or execution of additional operations when the event count of the specific types of event exceed respective thresholds can control power consumption by the processor so that the power consumption remains below a power virus (PV) level. Stalling execution of operations for a portion of the defined interval can result in reduction of overall energy consumption of the processor for the defined time interval. Monitoring of each event count can continue for each successive defined interval. In an embodiment each successive defined interval has the same number of clock cycles. Continuous monitoring can help to ensure that the power usage level of the processor remains below the PV level on an ongoing basis.

Figure 3:
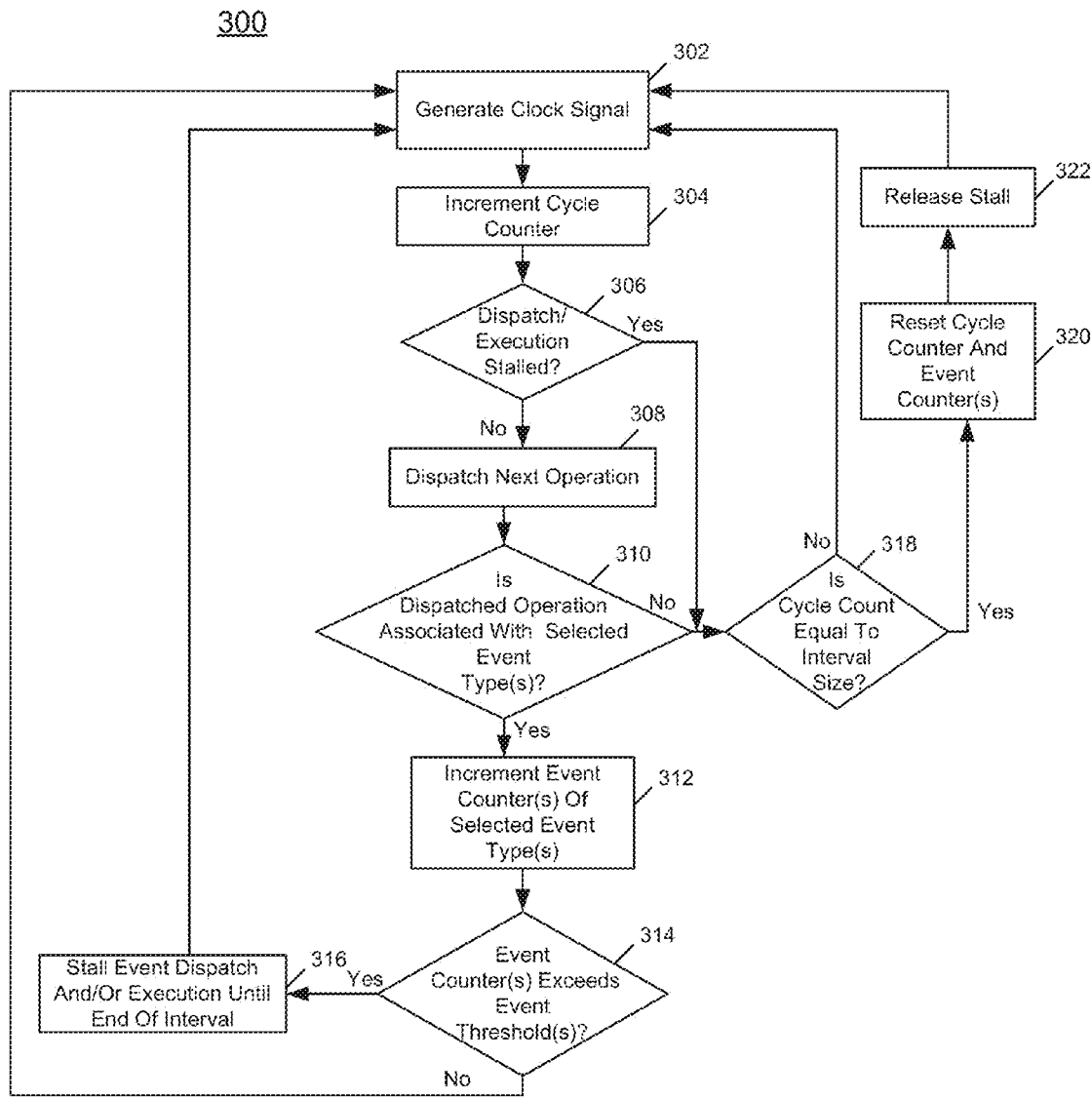
FIG. 3 is a flow diagram of a method of protecting a processor against excessive power usage, according to embodiments of the present invention.

FIG. 3 is a flowchart of a method 300 of protecting a processor against excessive power usage, according to embodiments of the present invention. In an embodiment, the method employs defined intervals of constant size ("interval size"), e.g., having the same number of clock cycles in each defined interval.

At block 302, a clock signal is generated for each execution cycle. Continuing to block 304, a cycle counter (which may reside within a core of the processor) is incremented. The cycle counter may be configured to maintain a count of cycles during a defined interval. Advancing to decision block 306, if dispatch and/or execution of operations is not stalled, proceeding to block 308, a next operation is dispatched (e.g., by dispatch logic within the processor) for execution in the core. Moving to decision diamond 310, if the dispatched operation is associated with one or more selected event types, e.g., execution of a vector floating point operation, accesses to one or more vector sources, level one cache access, or one or more other events that may be associated with high power usage by the core, proceeding to block 312 an event counter in the processor associated with a corresponding type of event is incremented. Each event counter maintains a count of events of the corresponding type that have occurred since a beginning of a defined interval. In some embodiments, some event counters may reside in a PVP within the core. In some embodiments, an event counter that counts level one cache accesses may reside in the level one cache of the core, or in a memory order buffer (MOB). Continuing to decision diamond 314, if the event counter exceeds a corresponding threshold (e.g., as determined by PVP logic in the core), proceeding to block 316 an event dispatcher and/or an execution unit in the processor may be stalled until the defined interval expires (e.g., by use of a stall routine). In another embodiment, the stall may apply only to operations associated with the event type whose event counter exceeds the respective threshold. In other embodiments, a stall of all additional operations may be triggered by two or more event counters that concurrently exceed respective combination thresholds, e.g., each combination threshold may be smaller than a corresponding single type event threshold for the event type being compared. Returning to block 302 the next clock signal is generated. At decision diamond 314, if the event counter does not exceed the corresponding event threshold (or the event counters do not concurrently exceed their corresponding combination thresholds), the method returns to block 302, where the next clock signal is generated.

Returning to decision diamond 306, if dispatch and/or execution of operations are stalled due to, e.g., an event count exceeding the corresponding event threshold, continuing to decision diamond 318 if the cycle count is not equal to a defined interval size, returning to block 302 the next clock signal is generated. If the cycle count is equal to the defined interval size (as determined by, e.g., the processor), proceeding to block 320 the cycle counter and the event counter(s) are reset. Continuing to block 322, the stall is released. Returning to block 302, the next clock signal is generated.

Figure 4:
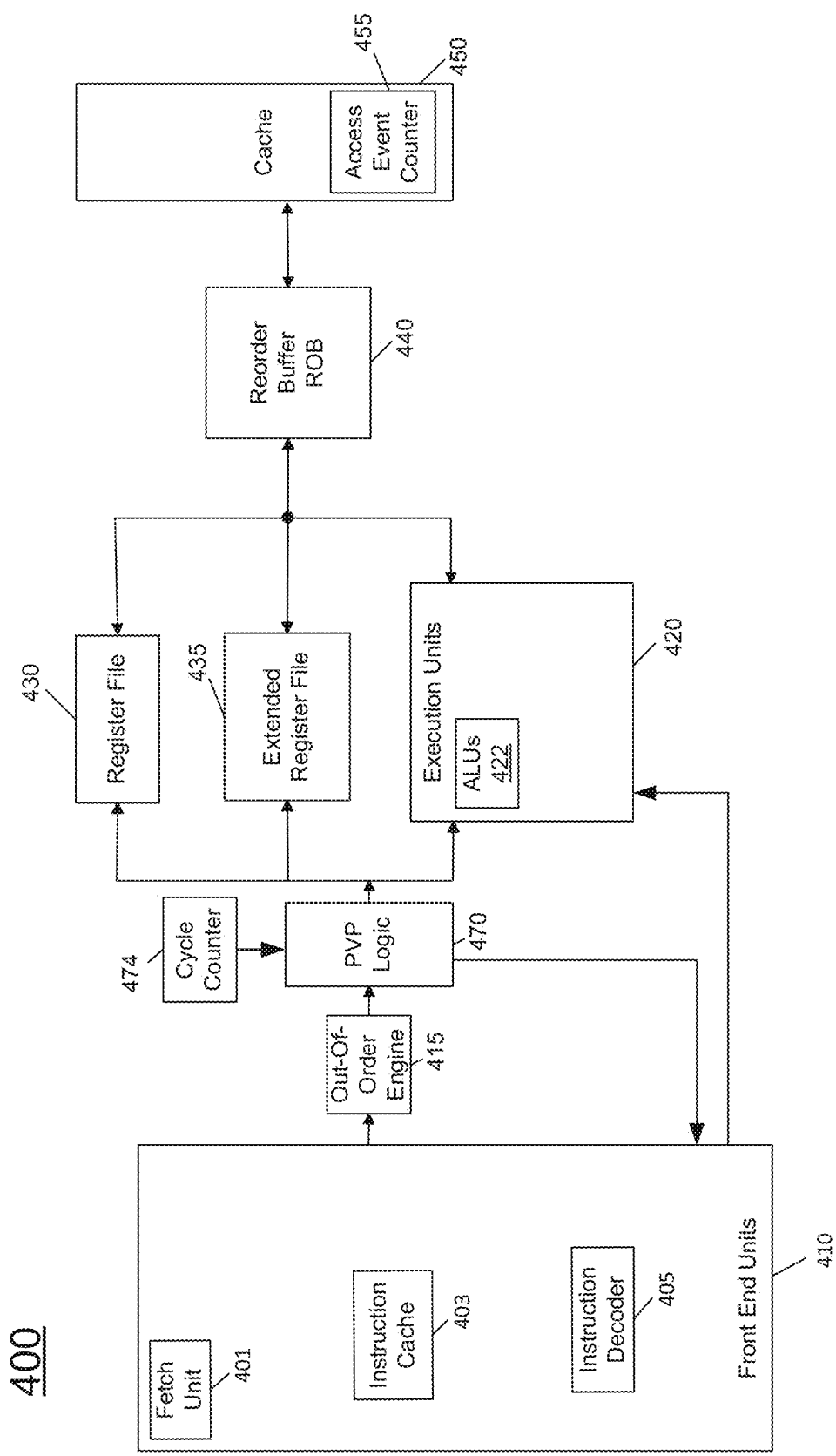
FIG. 4 is a block diagram of a processor core in accordance with an embodiment of the present invention.

Embodiments can be implemented in many different processor types. For example, embodiments can be realized in a processor such as a multicore processor. Referring now to FIG. 4, shown is a block diagram of a processor core in accordance with an embodiment of the present invention. As shown in FIG. 4, processor core 400 may be a multi-stage pipelined out-of-order processor. Processor core 400 is shown with a relatively simplified view in FIG. 4 to illustrate various features used in connection with power usage in accordance with embodiments of the present invention.

As shown in FIG. 4, core 400 includes front end units 410, which may be used to fetch instructions to be executed and prepare them for use later in the processor. For example, front end units 410 may include a fetch unit 401, an instruction cache 403, and an instruction decoder 405. Fetch unit 401 may fetch macro-instructions, e.g., from memory or instruction cache 403, and feed them to instruction decoder 405 to decode them into primitives such as operations (μops) for execution by the processor.

Coupled between front end units 410 and execution units 420 is an out-of-order (OOO) engine 415 that may be used to receive the instructions and prepare them for execution. More specifically OOO engine 415 may include various buffers to re-order operation flow and allocate various resources needed for execution, and may include event counters, e.g., to count vectorized floating point operations, vectorized source reads, or other events, in accordance with embodiments of the present invention.

As further seen in FIG. 4, core 400 can include PVP logic 470, in accordance with embodiment of the present invention, and a cycle counter 474. The PVP logic 470 can be configured to compare one or more event counts, e.g., associated with dispatched operations, to respective event thresholds and to cause the core to stall execution and/or dispatch of operations during a first defined interval of cycles when an event counts exceeds a corresponding threshold, or when a plurality of event counters exceed corresponding combination thresholds concurrently, according to embodiments of the present invention. The PVP logic 470 may permit execution of additional operations after the first defined interval expires, and the expiration of the first defined interval may be determined from a cycle count provided by the cycle counter 474, according to embodiments of the present invention.

In other embodiments, a plurality of PVP logics (not shown) may be included in the processor 400, and each PVP logic may be configured to track a different set of events, e.g., different types of operations to be dispatched. Each PVP logic may receive notification of event occurrences from sources within the processor, and the plurality of PVP logics may share their stall decisions (e.g., to enable awareness by one PVP logic of excessive activity in other parts of the processor 400), which may prompt a change in values of thresholds, e.g., "aggressiveness" of monitored events, in order to prevent a PV scenario.

OOO engine 415 may also provide renaming of logical registers onto storage locations within various register files such as register file 430 and extended register file 435. Register file 430 may include separate register files for integer and floating point operations. Extended register file 435 may provide storage for vector-sized units, e.g., 256 or 512 bits per register.

Various resources may be present in execution units 420, including, for example, various integer, floating point, and single instruction multiple data (SIMD) logic units, among other specialized hardware. For example, such execution units may include one or more arithmetic logic units (ALUs) 422.

When operations are performed on data within the execution units, results may be provided to retirement logic, namely a reorder buffer (ROB) 440. More specifically, ROB 440 may include various arrays and logic to receive information associated with operations that are executed. This information may then be examined by the ROB 440 to determine whether the operations can be validly retired and result data committed to the architectural state of the processor, or whether one or more exceptions have occurred that prevent a proper retirement of the operations. Of course, ROB 440 may handle other operations associated with retirement.

As shown in FIG. 4, ROB 440 is coupled to cache 450 which, in one embodiment may be a low level cache (e.g., an L1 cache) and which may also include an access event counter 455 to count accesses to cache lines (which count may be provided to the PVP logic 470) in accordance with embodiments of the present invention, although the scope of the present invention is not limited in this regard. From cache 450, data communication may occur with higher level caches, system memory and so forth.

Note that while the implementation of the processor of FIG. 4 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry. Furthermore, other embodiments may be implemented in a graphics processor. For implementation in a graphics processor, the detection and control can be done based on number of active execution units, special function blocks or so forth.

Figure 5:
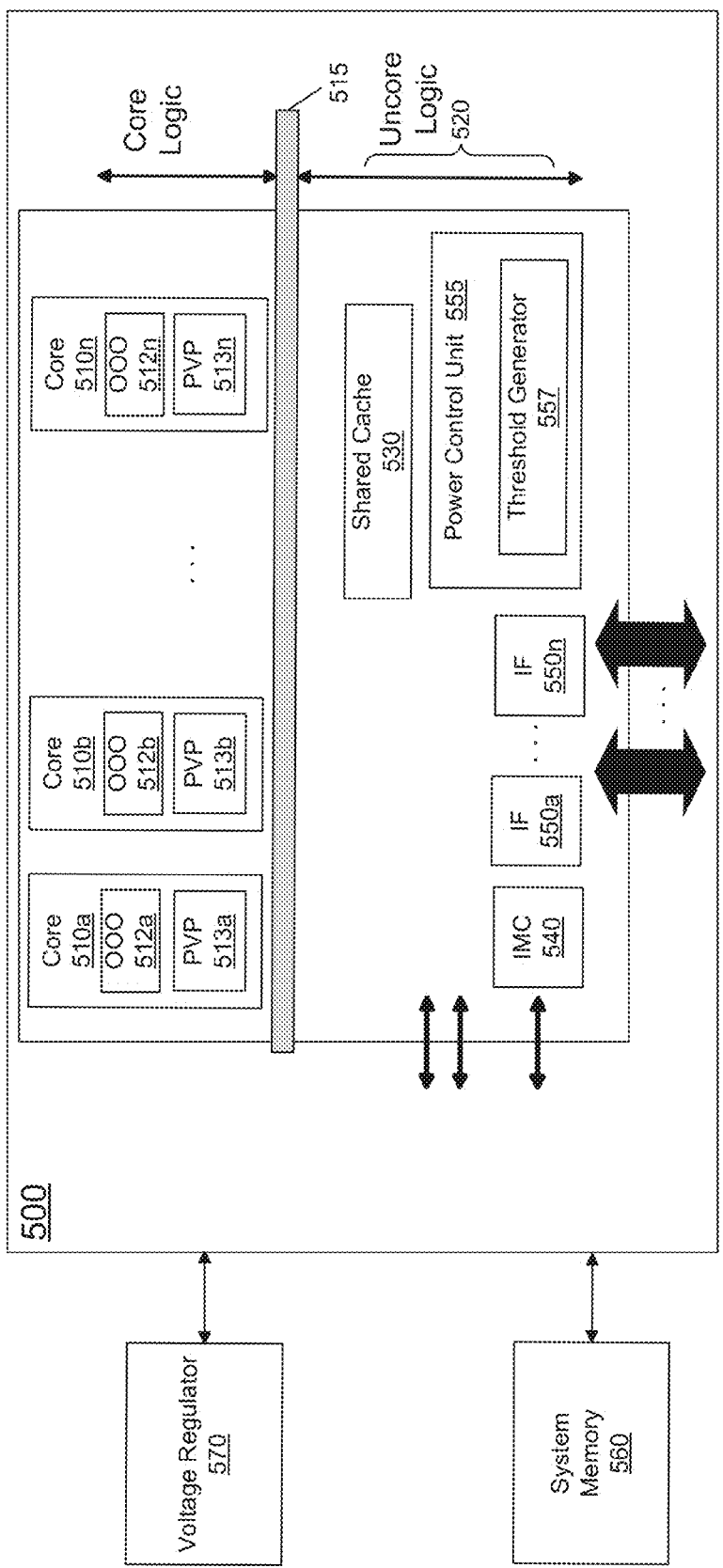
FIG. 5 is a block diagram of a processor in accordance with an embodiment of the present invention.

Referring now to FIG. 5, shown is a block diagram of a processor in accordance with an embodiment of the present invention. As shown in FIG. 5, processor 500 may be a multicore processor including a plurality of cores $510_a$-$510_n$. In one embodiment, each such core may be of an independent power domain and can be configured to operate at an independent voltage and/or frequency, and to enter turbo mode when available headroom exists. As seen, each core can include at least OOO $512_a$-$512_n$, that can provide event count information to PVP logic $513_a$-$513_n$, in accordance with embodiments of the present invention. The various cores may be coupled via an interconnect 515 to a system agent or uncore 520 that includes various components. As seen, the uncore 520 may include a shared cache 530, which may be a last level cache. In addition, the uncore may include an integrated memory controller 540, various interfaces 550, and a power control unit 555. In the embodiment of FIG. 5, power control unit 555 that may be configured to determine event monitoring configuration (e.g., interval size of monitored interval, weighting applied to a given type of operation, etc.), including to generate one or more event count thresholds via a threshold generator 557, each threshold associated with a corresponding event type, according to embodiments of the present invention. (Alternatively, thresholds may be stored in control registers within the processor 500, e.g., within each core $510_0$-$510_n$. Each threshold may be compared with a corresponding event count by PVP logic $513a$-$513n$, and when the event count exceeds the corresponding threshold, or when each of several event counts exceed corresponding combination thresholds concurrently, execution and/or dispatch of additional operations may be stalled for a remainder of a defined interval, according to embodiments of the present invention.

With further reference to FIG. 5, processor 500 may communicate with a system memory 560, e.g., via a memory bus. In addition, by interfaces 550, connection can be made to various off-chip components such as peripheral devices, mass storage and so forth. Also shown in FIG. 5 is a voltage regulator 570 to regulate power supplied to the cores $510a$-$510n$ based on input received from the PVP logic $513a$-$513n$. While shown with this particular implementation in the embodiment of FIG. 5, the scope of the present invention is not limited in this regard.

Figure 6:
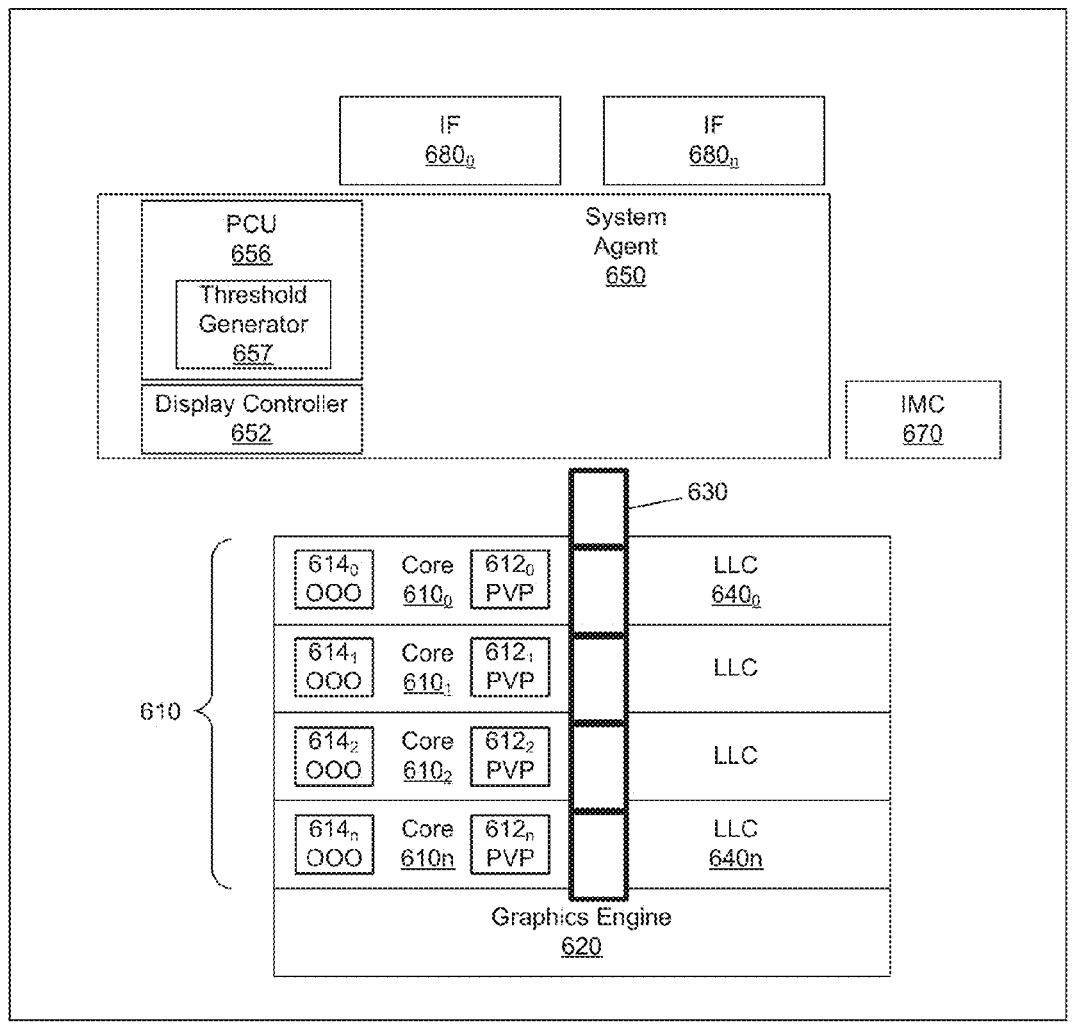
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 600 includes multiple domains. Specifically, a core domain 610 can include a plurality of cores $610_0$-$610_n$, a graphics domain 620 can include one or more graphics engines, and a system agent domain 650 may further be present. Note that additional domains can be present in other embodiments. For example, multiple core domains may be present each including at least one core.

In general, each core 610 may further include low level caches in addition to various execution units and additional processing elements along with PVP logic $612_0$-$612_n$ and OOOs $614_0$-$614_n$. The OOOs $614_0$-$614_n$ may provide a count of dispatched events of each of one or more selected types to the corresponding PVP logic $612_0$-$612_n$, which may compare each event count to a corresponding threshold and may stall additional operations from dispatch and/or execution responsive to an event count exceeding a corresponding threshold, in accordance with embodiments of the present invention. The various cores may be coupled to each other and to a shared cache memory formed of a plurality of units of a lower level cache (LLC) $640_0$-$640_n$. In various embodiments, LLC $640_0$-$640_n$ may be shared amongst the cores and the graphics engine, as well as various media processing circuitry. As seen, a ring interconnect 630 couples the cores together, and provides interconnection between the cores, graphics domain 620 and system agent circuitry 650.

As further seen, system agent domain 650 may include display controller 652, which may provide control of, and an interface to, an associated display. As further seen, system agent domain 650 may include a power control unit 656 to perform power management operations for the processor. In the embodiment of FIG. 6, the power control unit 656 can include a threshold generator 657 to provide one or more defined thresholds to one or more of the PVP logic $612_0$-$612_n$ in accordance with embodiments of the present invention.

As further seen in FIG. 6, processor 600 can further include an integrated memory controller (IMC) 670 that can provide for an interface to a system memory, such as a dynamic random access memory (DRAM). Multiple interfaces $680_0$-$680_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 6, understand the scope of the present invention is not limited in this regard.

Figure 7:
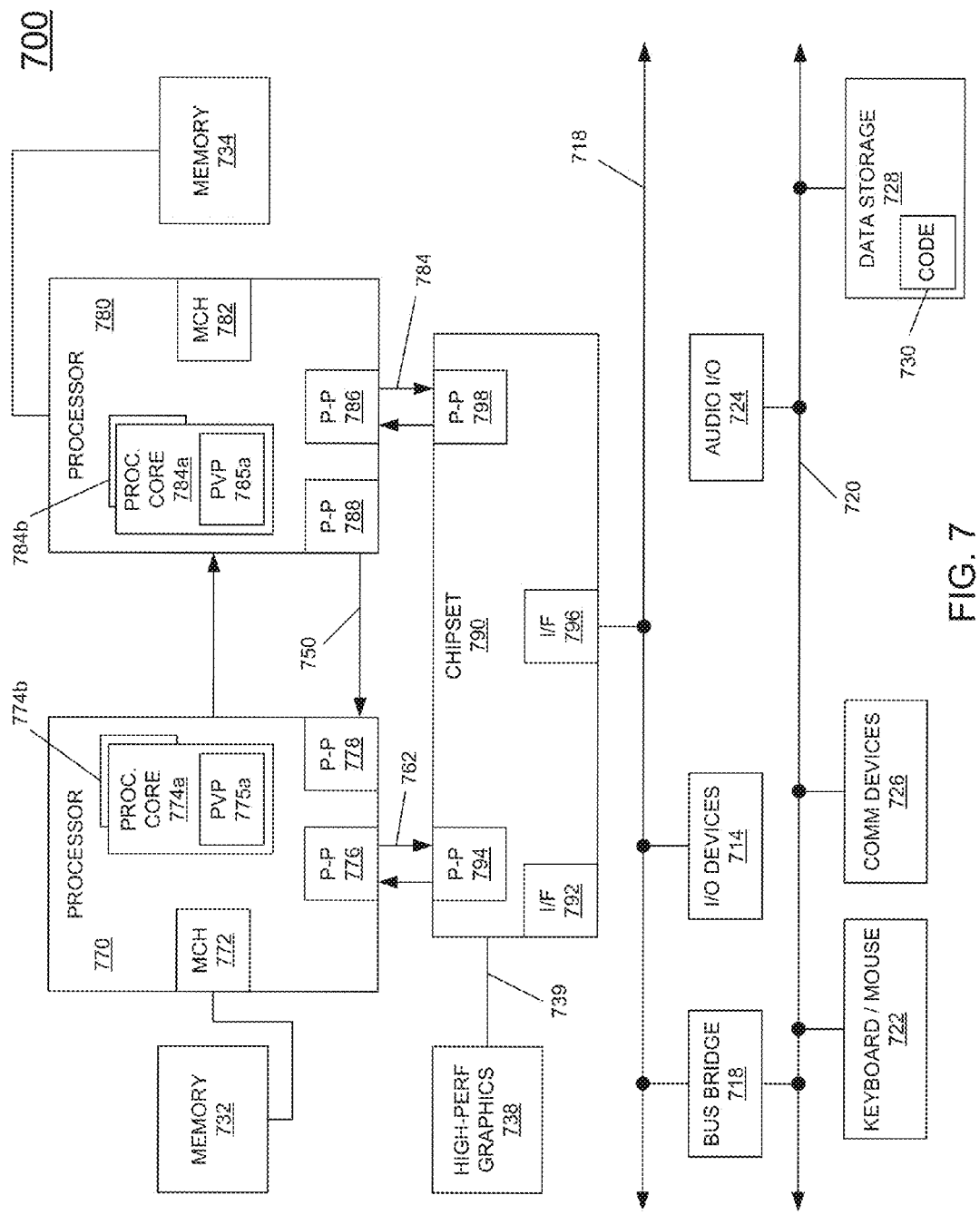
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors. Each of the cores can include PVP logic (e.g., 775a and 785a) to compare one or more counts of selected event types (e.g., vector floating point operation, data access to level one cache, vector source reads per operation) to a corresponding event threshold and to cause a stall in dispatch and/or execution of additional operations when the event threshold(s) is (are) exceeded, in accordance with embodiments of the present invention.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 784, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, Ultrabook™, or so forth.

The following examples pertain to further embodiments.

In a first example, a processor to protect against excessive power usage includes at least a first core to execute operations, where the first core includes execution logic to execute operations, a first event counter to determine a first event count associated with events of a first type that have occurred since a start of a first defined interval, a second event counter to determine a second event count associated with events of a second type that have occurred since the start of the first defined interval, and stall logic to stall the execution of operations, including at least first operations associated with events of the first type, until the first defined interval is expired responsive to the first event count exceeding a first combination threshold concurrently with the second event count exceeding a second combination threshold. Optionally, the first combination threshold and the second combination threshold are selected based on an expected power consumption of the core during the first defined interval. Optionally each event of the first type is an execution of a vectorized floating point operation. Optionally, each event of the first type is vector source read or vector source write. Optionally, each event of the second type is a level one cache access and the second event count is incremented an amount based on a size of the data accessed. Optionally, responsive to the first event count exceeding a first event threshold that is larger than the first combination threshold while the second event threshold does not exceed the second combination threshold, the stall logic is to selectively stall execution of the operations associated with events of the first type and to permit execution of other operations. Optionally, the stall logic is to clear the first event count and the second event count when the defined interval expires and permit additional operations to execute during a second defined interval. Optionally, the processor further includes power control logic to determine the first combination threshold and the second combination threshold based on a first power usage associated with an event of the first type, a second power usage associated with an event of the second type, and an expected power consumption of the first core during the first defined interval.

In a second example, a system to protect against excessive power usage includes a processor including at least a first core that includes execution logic for executing operations, a first event counter to determine a first event count associated with events of a first type that have executed since a start of a first defined interval, a second event counter to determine a second event count associated with events of a second type that have executed since the start of the first defined interval, stall logic to stall the execution of operations, including first operations associated with events of the first type, until the first defined interval is expired responsive to the first event count exceeding a first combination threshold concurrently with the second event count exceeding a second combination threshold, and a memory for storing data and coupled to the processor. Optionally, the stall logic is further to selectively stall the execution of operations associated with events of the first type until the first defined interval is expired while permitting other operations to execute during the first defined interval responsive to the first event count exceeding a first event threshold that is larger than the first combination threshold and the second event count being less than or equal to the second combination threshold. Optionally, the stall logic is further to stall the execution of operations until the first defined interval is expired, responsive to the second event count exceeding a second event threshold that is larger than the second combination threshold. Optionally, events of the first type include one of executed vectorized floating point operations, executed vectorized source reads or writes, and data accesses to a level one cache of the processor. Optionally, the memory includes a dynamic random access memory (DRAM). Optionally, the processor includes power control logic to determine the first combination threshold and the second combination threshold based on an expected power consumption of the processor during the defined interval. Optionally, the first combination threshold is determined further based on a first power usage associated with an event of the first type and the second combination threshold is determined further based on a second power usage associated with an event of the second type.

In a third example, a method of protecting against excessive power usage includes comparing, by comparison logic of a processor, a first count of events of a first type that have occurred since a start of a first defined interval, to a first threshold, and selectively stalling, by stall logic of a core of the processor, execution by the core of operations associated with the events of the first type until the first defined interval expires responsive to the first count exceeding the first threshold, while permitting other operations to execute during an entirety of the first defined interval. Optionally, the events of the first type are one of level one cache accesses during the first defined interval, executed vectorized floating point operations, and vector source reads or writes. Optionally, the method also includes determining the first threshold based on upon power consumption associated with an event of the first type and further based on expected power consumption of the core during the first defined interval. Optionally, the method includes clearing the first event type count when the defined interval expires and allowing dispatched operations to execute during a second defined interval. Optionally, the method includes comparing, by the comparison logic, the first count of events of the first type to a first combination threshold that is smaller than the first threshold, comparing, by the comparison logic, a second count of events of a second type to a second combination threshold, and stalling execution of operations by the core until the defined interval expires responsive to the first count exceeding the first combination threshold concurrently with the second count exceeding the second combination threshold. Optionally, the method includes determining the first combination threshold and the second combination threshold based on upon power consumption associated with an event of the first type and an event of the second type, respectively, and further based on expected power consumption of the core during the first defined interval.

In a fourth example, at least one computer readable medium includes instructions that when executed enable a system to compare a first count of events of a first type that have occurred since a start of a first defined interval, to a first threshold, and selectively stall execution by a core of operations associated with the events of the first type until the first defined interval expires responsive to the first count exceeding the first threshold and permit other operations to execute during an entirety of the first defined interval. Optionally, the events of the first type are level one cache accesses during the first defined interval, executed vectorized floating point operations, or vector source reads or writes. Optionally, the at least one computer readable medium further includes instructions to determine the first threshold based on upon power consumption associated with an event of the first type, and further based on expected power consumption of the core during the first defined interval. Optionally, the at least one computer readable medium further includes instructions to clear the first event type count when the defined interval expires and to allow dispatched operations to execute during a second defined interval. Optionally, the at least one computer readable medium further includes instructions to compare the first count of events of the first type to a first combination threshold that is smaller than the first threshold, and to compare, by the comparison logic, a second count of events of a second type to a second combination threshold, and to stall execution of operations by the core until the defined interval expires responsive to the first count exceeding the first combination threshold concurrently with the second count exceeding the second combination threshold. Optionally, the at least one computer readable medium further includes instructions to determine the first combination threshold and the second combination threshold based on upon power consumption associated with an event of the first type and an event of the second type, respectively, and further based on expected power consumption of the core during the first defined interval.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
  at least a first core that includes:
    execution logic to execute operations;
    a first event counter to determine a first event count associated with events of a first type that have occurred since a start of a first defined interval;

a second event counter to determine a second event count associated with events of a second type that have occurred since the start of the first defined interval; and stall logic to stall execution of the operations, including at least first operations associated with events of the first type, until the first defined interval is expired responsive to the first event count exceeding a first combination threshold concurrently with the second event count exceeding a second combination threshold.

2. The processor of claim 1, wherein the first combination threshold and the second combination threshold are selected based on an expected power consumption of the core during the first defined interval.

3. The processor of claim 1, wherein each event of the first type is an execution of a vectorized floating point operation.

4. The processor of claim 1, wherein each event of the first type is vector source read or vector source write.

5. The processor of claim 1, wherein each event of the second type is a level one cache access and the second event count is incremented an amount based on a size of the data accessed.

6. The processor of claim 1, wherein responsive to the first event count exceeding a first event threshold that is larger than the first combination threshold while the second event threshold does not exceed the second combination threshold, the stall logic is to selectively stall execution of the first operations associated with events of the first type and to permit execution of other operations.

7. The processor of claim 1, wherein the stall logic is to clear the first event count and the second event count when the first defined interval expires and permit additional operations to execute during a second defined interval.

8. The processor of claim 1, wherein the processor further includes power control logic to determine the first combination threshold and the second combination threshold based on a first power usage associated with an event of the first type, a second power usage associated with an event of the second type, and an expected power consumption of the first core during the first defined interval.

9. A system comprising:
a processor including at least a first core, wherein the first core includes:
   execution logic to execute operations;
   a first event counter to determine a first event count associated with events of a first type that have executed since a start of a first defined interval;
   a second event counter to determine a second event count associated with events of a second type that have executed since the start of the first defined interval;
   stall logic to stall execution of operations, including first operations associated with events of the first type, until the first defined interval is expired responsive to the first event count exceeding a first combination threshold concurrently with the second event count exceeding a second combination threshold; and
a dynamic random access memory (DRAM) coupled to the processor.

10. The system of claim 9, wherein the stall logic is further to selectively stall the execution of the first operations associated with events of the first type until the first defined interval is expired while permitting other operations to execute during the first defined interval responsive to the first event count exceeding a first event threshold that is larger than the first combination threshold and the second event count being less than or equal to the second combination threshold.

11. The system of claim 9, wherein the stall logic is further to stall the execution of the first operations until the first defined interval is expired, responsive to the second event count exceeding a second event threshold, wherein the second event threshold is larger than the second combination threshold.

12. The system of claim 9, wherein the processor further comprises power control logic to determine the first combination threshold and the second combination threshold based on an expected power consumption of the processor during the first defined interval.

13. The system of claim 12, wherein the first combination threshold is determined further based on a first power usage associated with an event of the first type and the second combination threshold is determined further based on a second power usage associated with an event of the second type.

14. The system of claim 9, wherein events of the first type comprise one of executed vectorized floating point operations, executed vectorized source reads or writes, and data accesses to a level one cache of the processor.

15. A method comprising:
comparing, by comparison logic of a processor, a first count of events of a first type that have occurred since a start of a first defined interval, to a first threshold; and
selectively stalling, by stall logic of a core of the processor, execution by the core of operations associated with the events of the first type until the first defined interval expires responsive to the first count exceeding the first threshold, while permitting other operations to execute during an entirety of the first defined interval.

16. The method of claim 15, wherein the events of the first type are one of:
level one cache accesses during the first defined interval;
executed vectorized floating point operations; and
vector source reads or writes.

17. The method of claim 15, further comprising determining the first threshold based on upon power consumption associated with an event of the first type and further based on expected power consumption of the core during the first defined interval.

18. The method of claim 15, further comprising clearing the first event type count when the first defined interval expires and allowing dispatched operations to execute during a second defined interval.

19. The method of claim 15, further comprising:
comparing, by the comparison logic, the first count of events of the first type to a first combination threshold that is smaller than the first threshold;
comparing, by the comparison logic, a second count of events of a second type to a second combination threshold; and
stalling execution of operations until the first defined interval expires responsive to the first count exceeding the first combination threshold concurrently with the second count exceeding the second combination threshold.

20. The method of claim 19, further comprising determining the first combination threshold and the second combination threshold based on upon power consumption associated with an event of the first type and an event of the second type, respectively, and further based on expected power consumption of the core during the first defined interval.

* * * * *